United States Patent

Plewa et al.

[11] Patent Number: 5,842,915
[45] Date of Patent: Dec. 1, 1998

[54] METHOD AND DEVICE FOR SEALING OFF A PACKAGING WRAPPER

[75] Inventors: Manfred Plewa, Verden; Dieter von der Heyden, Mühltal, both of Germany

[73] Assignee: Tipper Tie technopack GmbH, Glinde, Germany

[21] Appl. No.: 809,188

[22] PCT Filed: Sep. 15, 1997

[86] PCT No.: PCT/EP95/03647

§ 371 Date: Mar. 21, 1997

§ 102(e) Date: Mar. 21, 1997

[87] PCT Pub. No.: WO96/09208

PCT Pub. Date: Mar. 28, 1996

[30] Foreign Application Priority Data

Sep. 22, 1994 [DE] Germany ............... 94 15 379.4

[51] Int. Cl.[6] .................................................. A22C 11/12
[52] U.S. Cl. ........................................................ 452/48
[58] Field of Search ................................ 452/48, 187

[56] References Cited

U.S. PATENT DOCUMENTS

| 2,225,694 | 12/1940 | Freeman | 452/48 |
| 4,044,450 | 8/1977 | Raudys et al. | 452/48 |
| 4,675,945 | 6/1987 | Evans et al. | 452/48 |
| 4,773,128 | 9/1988 | Stanley et al. | 452/48 |
| 4,796,332 | 1/1989 | Stanley | 452/48 |
| 5,269,116 | 12/1993 | Roberts et al. | 452/40 |

FOREIGN PATENT DOCUMENTS 1100849 1/1968 United Kingdom ............ B65B 51/04

*Primary Examiner*—Willis Little
*Attorney, Agent, or Firm*—Alix, Yale & Ristas, LLP

[57] ABSTRACT

A method and device are disclosed for closing off the bunched end of a packaging wrapper and for trying in a label (4) in the closure element (3) which closes off the end (2). The proposed method and device are distinguished by the fact that the end (5) of the label (4) which is to be tied in is introduced before the strand into the closure area (13) of the closure device, while its rear end (6) is held in the label guide (21).

18 Claims, 2 Drawing Sheets

METHOD AND DEVICE FOR SEALING OFF A PACKAGING WRAPPER

BACKGROUND OF THE INVENTION

It is known to close the shirred end piece of a casing, for example of an end of a sausage casing, by means of a U-shaped wire staple which is bent around the end piece. For this purpose, the apparatus has a closure region which is formed as a cutout in one or more plate-like elements which, in the mutually opposite borders of the cutout, contain guide grooves for the staple legs, while an anvil for bending the staple ends is provided at the end of the cutout. A ram pushes the staple, with its open side in front, into the closure region, in which the end piece which is to be closed is located.

A description of the product is usually provided on the casing. It is also possible to incorporate into the closure a cord loop, which may be provided with a label at a later stage. It is also known (U.S. Pat. No. 4,044,450, GB-A 1100849) to introduce a strip-like label into the path in which the staple moves to the closure region. The staple carries the label along with it and incorporates it into the casing closure. This operation only functions satisfactorily if the label is reliably carried along by the staple. Since, however, it cannot be fastened on the staple and is very lightweight, it may easily slide away to one side or the other during the advancement of the staple. Its projecting ends, on both sides, thus have to be very long in order to be carried along reliably. These ends are unsightly on the finished product. If there is printing on the label, it is very difficult to predict the location, on the finally incorporated label, of the printing in relation to the closure.

SUMMARY OF THE INVENTION

The object of the invention is to provide a process and an apparatus which avoids these disadvantages.

Accordingly, the front, free end of the label is introduced into the closure region before the end piece of the casing, the rear end of the label still being located in the label guide, with the result that the label is retained by the guide. The label is retained in this way until at least just before the commencement of the closure operation. Expediently, the rear end of the label still remains in the label guide during the closure operation and is only drawn out when the closed end piece of the casing is removed from the closure region.

The label guide is designed such that it opens out at the closure region and a label end extending therefrom is directed into the closure region. Advancement and retaining means are provided, and these ensure that a predetermined label section projects into the closure region, in order to be gripped by the closure staple together with the end piece which is to be closed, while the rear end of the label is still retained by the guide. This achieves precise, reproducible positioning of the label. The leading, free, non-supported end of the label is introduced into the closure region at a point in time at which it is not obstructed from doing so by a casing end piece located in the closure region. According to the invention, it is thus possible to switch on the means for advancing the label only when the closure region is free. This is expediently determined by a sensor which determines the presence of an end piece in the closure region. It is usually also sufficient to use a sensor which determines the removal of an end piece, because it can be assumed that the closure region is free immediately after the removal of an end piece. For this purpose, it is suitable to use, for example, a flap which covers, on the removal side, the anvil and part of the closure region and, when the closed end piece is removed, is raised from the closure region counter to spring force. This flap movement can signal the removal of the end piece to the control device and thus initiate the advancement of a new label. Even more simple, and thus preferred, is an embodiment in which the sensor determines whether the rear end of the label is located in the label guide. Since the label is only removed from the guide when the closed end piece is removed from the closure region, the removal of the label from the guide signals that the closure region is free. Immediately after the removal of the label from the guide, a new label may thus be advanced.

If the closure apparatus is connected to an automatic filling device (for example a sausage-filling machine), and a certain control sequence is thus predetermined for the closure apparatus, it is also possible for the label advancement to be incorporated into this operational sequence such that it automatically takes place in an operating phase in which the closure region is free.

If the end piece which is to be closed is introduced into the closure region transversely with respect to its longitudinal extent, its movement running parallel to the plate which forms the closure region, it need not be feared that the label end projecting into the closure region is displaced out of the closure region by this movement. The side from which the label end is introduced into the closure region is thus immaterial. If, in contrast, the end piece which is to be closed passes into the closure region by a movement which, runs in its longitudinal direction or with a longitudinal component, the label should be fed to the closure region from the same side as the end piece.

Expediently, use is made of a virtually endless label band, and the label guide has a cutting device which severs the label used in each case from the band. This not only simplifies the feed, but also makes it possible to secure the label which is used in each case until just before the closure operation or, if required, even until during this operation, in that the cut is controlled such that it takes place just before, during or just after the closure operation. This desired effect is achieved since, as long as the label remains connected to the label band, it is barely conceivable, under the forces which occur with the feed of the end piece and during the closure operation, for the label to be drawn out of the guide, or pushed back into the same, unintentionally. However, this aim may also be achieved according to the invention without the cut being controlled precisely in temporal terms, in relation to the closure operation, that is to say in that the cut is made in an incomplete manner, with the result that the label is still connected to the label strip via a narrow web. This makes it possible to make the cut before completion of the label advancement, without there being any risk of the label and the label band following it being pushed one above the other in the label guide. The strength of this web is expediently such that the label is not removed from the envisaged position by any forces which may occur, but the web severs easily at the latest when the closed end piece is removed from the closure region. This can also take place during the closure operation or when the end piece is introduced into the closure region.

The label may be introduced into the closure region with its short end or its long end in front. The first scenario is often to be preferred because the position of the free label end in the closure region and the guidance of the label become more stable the shorter the free end of the label is. This is achieved by the distance of the cutting device from the closure region (measured along the label guide) being larger than half the label-advancement path, which corresponds to the label length. The free end should then usually be as short as possible and should only be long enough to ensure inclusion in the closure staple. The majority of the length of the label respectively incorporated with the closure is then still located in the label guide and is only drawn out of this guide by the removal of the closed end piece. This has the advantage that the operation of drawing out the label simultaneously strips off any soiling which may have accumulated in the region of the opening of the label guide in conjunction with the closure operation. The arrangement thus cleans itself, and malfunctions due to soiling of the label guide are extremely unlikely.

For reasons of hygiene in the processing of foodstuffs and also for reasons of practicability, the label guide should not be present, in practice, in the vicinity of the closure region. This is achieved according to the invention in that the label guide runs parallel to the plate-like parts of the apparatus which form the closure region, and a deflection is provided just in front of the closure region. The guide may run, in particular, between a plate which helps to form the closure region and an adjacent plate, the deflection being formed by one of these plates. Instead of this, however, it is also possible for the label guide, to be arranged in some other manner, for example such that it runs in a rectilinear manner (without deflection) obliquely to the closure region.

In the so-called rolling-action definition of the wire staples, in which operation the staple ends come to rest one behind the other in the longitudinal direction of the casing end piece, use is occasionally made of staple guides in which the guide plane determined by the mutually opposite guide grooves is not located parallel to the plate or the plates containing the closure region, but is inclined with respect to the same. In such a case, it is expedient if the guide plane is inclined in the direction in which the normal to this plane is inclined with respect to the opening of the label guide. This is because then reliable introduction of the label end into the closure region is achieved even with relatively slight deflection of the label.

In a number of cases, a cutter is provided adjacent to the closure region for the purpose of severing the closed end piece. In such a case, the opening of the label guide is expediently provided in a region which is located between the closure region and the plane of action of the cutter.

The invention may also be used for so-called double clippers, in which two closure staples are simultaneously provided on the same casing end piece at a certain longitudinal distance apart. In such a case, the opening of the label guide may also be located between the two closure regions, the label end which is to be clipped in being directed outwards. However, said opening may also be located outside the two closure regions, in which case the label end which is to be clipped in is directed inwards.

BRIEF DESCRIPTION OF THE INVENTION

The invention is explained in more detail hereinbelow with reference to the drawing, which illustrates an advantageous exemplary embodiment and in which.

DESCRIPTION OF A PREFERRED EMBODIMENT

Figure 1:
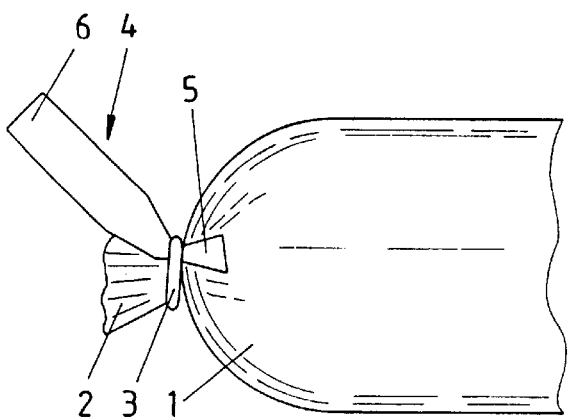
FIG. 1 shows an end of a sausage with a label.

The casing of a sausage 1 is gathered together at the end to form an end piece 2 which is closed by means of a wire staple 3. Incorporated into the staple and secured thereby is a label 4, of which the shorter end 5 is located on one side of the staple 3 and the longer end 6 is located on the other side of the staple 3.

Figure 2:
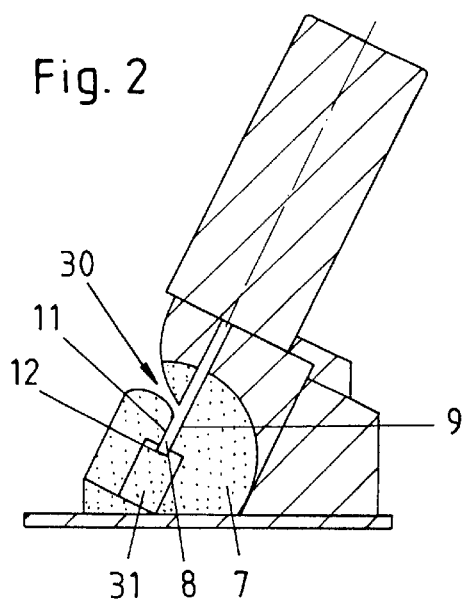
FIGS. 2 and 3 show schematic side views of the two closure apparatuses on which the invention can be used.

The machine illustrated in FIG. 2 is of a known type. The closing plate 7 contains a slot-like cutout 8 which is accessible by way of an opening 30. The rear border 9 and the front border 11 of said cutout 8 each have a guide groove for the two legs of a U-shaped wire staple and the ram which advances the staple. An anvil 12 is provided at the bottom end of the cutout 8. If the ram drives the staple against the anvil 12 with the open end in front, then the legs are bent over, in order to enclose an end piece 2 located between the borders 9 and 11 and the anvil 12 and thus to form a staple 3. The opening between the borders 9, 11 and the anvil 12 forms the closure region, which is designated by the reference numeral 13 in FIG. 4.

If the intention is to close an end piece, possibly the open end of a packaging bag or of a sausage casing, which has previously been shirred by hand or by suitable means, this end piece is introduced into the slot-like cutout 8 by way of the opening 30. Since the operation of removing the closed end piece by way of the narrow opening 30 may be a laborious one, a flap 31 is provided at the bottom end of the cutout 8, by means of which flap that region of the cutout 8 in which the closed end piece is located can be opened to a large extent to the side. It is forced into the closed position by spring force. Pulling on the closed end piece makes it possible for the latter to be drawn out, while the flap 31 opens counter to spring force.

Figure 3:
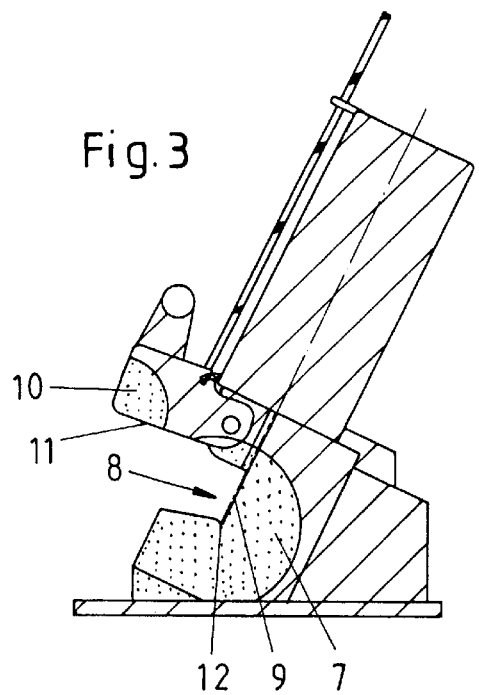

The design of the machine according to FIG. 3 differs from that according to FIG. 2 in that the border 11 of the cutout 8 is arranged on a movable shirring plate 10, which is shown in the open state. This shirring plate can be flung into the cutout 8, with the result that the latter is closed apart from the slot 8, which can be seen in FIG. 2. After the closure of an end piece, the shirring plate 10 is opened and the end piece is removed by way of the cutout 8, which is then opened to a large extent.

Figure 4:
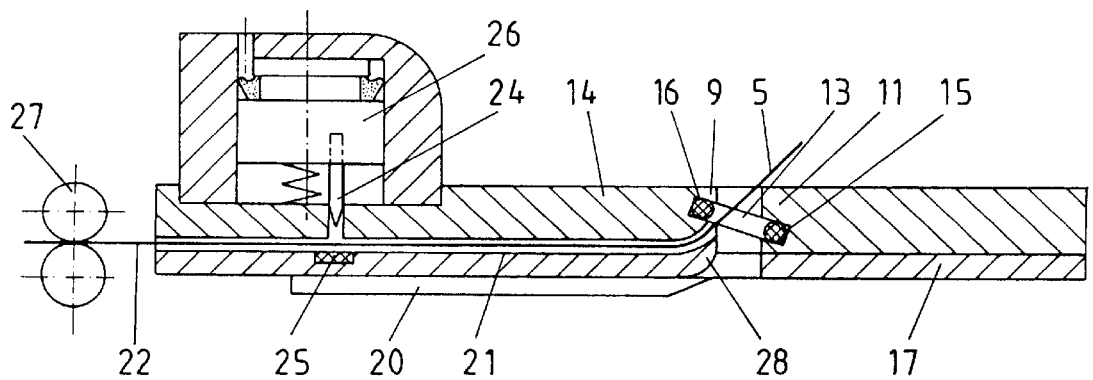
FIG. 4 shows a horizontal section showing essential parts of the arrangement according to the invention.

A continuous closing plate 14 is shown in FIG. 4. However, the depicted arrangement applies not only to the design according to FIG. 2, but also to the apparatus illustrated in FIG. 3, when the closing plate 10 of the latter has been closed. For the sake of simplicity, the flap 31 has been omitted in FIG. 4.

The borders 9, 11 bordering the closure region 13 contain grooves 15, 16 as staple and ram guides. The legs of a staple are indicated in a hatched manner in section therein.

Located beside the closing plate 14 is a plate 17 which may help to form a guide for a cutter, which is indicated schematically by the numeral 20, and is thus designated as cutter plate. The cutter 20 serves for severing a closed casing end piece. It is connected to a suitable drive, which is not of interest in the present context and is thus not illustrated. On the far side of the cutter plate 17, it is possible to provide a further closing plate with associated closure members in order to close an end piece at a second location which is offset with respect to the closure region 13.

Between the cutter plate 17 and the closing plate 14 there is made a guide channel 21 for a label strip 22, this channel running parallel to the closing plate 14 and being deflected through approximately 45° only at its end 28 which opens out in the closure region 13, with the result that the free end 5 of the label strip 22 passes through the closure region 13 towards the free side of closing plate 14. The guide channel 21 is milled in a shallow manner into the closing plate 14 and is covered by the cutter plate. It is shown FIGS. 5–8, the cutter plate having been removed.

It can be seen in FIG. 4 that the staple guide formed by the grooves 15, 16 is not perpendicular with respect to the longitudinal direction of the closure region 13, but is slightly inclined with respect to the same, the staple-guide axis (that is the perpendicular to the centre of the staple-guide-containing plane in the closure region 13) is inclined such that it approaches the direction of the projecting label end 5.

Arranged on the guide channel 21 at a distance from the closure region 13 which corresponds to the length of the section 6 of the label 4 is a cutting device which comprises a cutter 24 which, transversely with respect to the guide channel 21, interacts with a compliant abutment 25, arranged on the other side of said channel, for the purpose of severing the label band 22. For the driving thereof, a piston 26 which is actuated pneumatically counter to spring force is indicated.

The band 22 is to be imagined as a strip, of preferably constant width, made of a, for example, textile-like or paper-like flat material which is sufficiently stiff to be able to be advanced through the guide channel 21 by an advancement member, which is illustrated as a pair of rollers 27.

The advancement drive is controlled such that the advancement takes place in each case when it is sufficiently certain that the closure region 13 is free. A special sensor may be provided for this purpose. Instead of this, the advancement may also take place in each case when a closed casing end piece has just been removed from the closure region 13. This can be determined, for example by the opening actuation of the shirring plate 10, provided this is positively connected to an ejector, or by the actuation of the flap 31, which opens counter to spring force when the closed end piece is drawn out. In other cases it is possible to select a suitable point in time in a predetermined phase of the automatically controlled operational sequence. A special sensor arrangement is described with reference to FIGS. 5–8.

Figure 5:
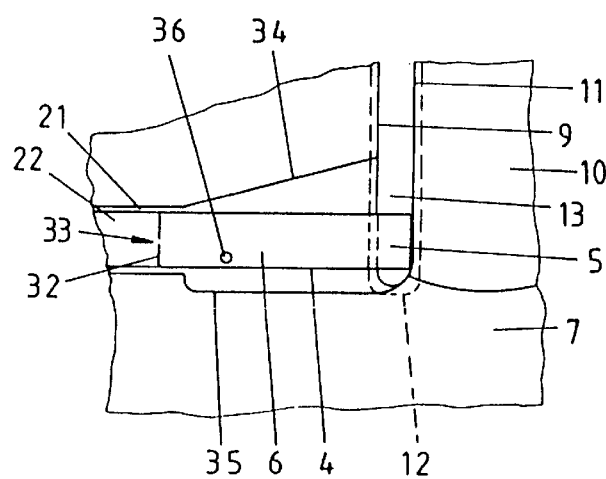
FIGS. 5 to 8 show partial side views of an apparatus according to the invention in different stages of operation.
Figure 7:
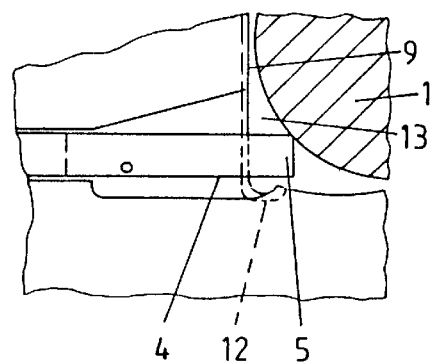

FIG. 5 shows the state in which the label 4 is ready for incorporation into the closure. Its rears longer end 6 is located in the guide channel 21. Its front, free end 5 is located in the closure region 13 in the vicinity of the anvil 12, approximately where the casing end piece is subsequently located during the closure operation. The label 4 is separated from the rest 22 of the band by a cut 32 which is interrupted in the centre, with the result that a narrow connecting web 33 remains between the label 4 and that part of the band 22 which is secured by the advancement means 27. As a result, the label 4 is still advanced after the cut has been made, without the label 4 and the adjoining part of the band 22 being pushed one above the other. In addition, the label is secured in the position shown in FIG. 5, as long as it is not subjected to any forces which are greater than the strength of the web 33.

In its part which is in the vicinity of the closure region 13, the guide channel 21 is widened by an edge 34 which runs obliquely upwards and by an edge 35 which is offset downwards. This gives the label 4 freedom of movement in the downward and upward directions during the closure operation and during the removal operation. Nevertheless, in the position according to FIG. 5, in which the label 4 is ready for incorporation into the closure, its free end 5 has an always constant position within the closure region 13.

Figure 6:
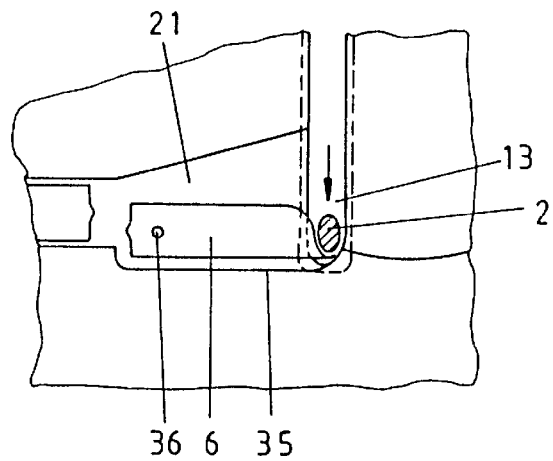

If, then, according to FIG. 6, a casing end piece 2 is guided into the closure region, then it comes into contact with the free end 5 of the label 4. Both the end piece 2 and the label end, 5 are then adjacent in the closure region 13 and can both be gripped together by a closure staple. This then results in the situation which is illustrated in FIG. 6. The pressure exerted by the ram and staple has pushed the end piece 2 and label in the closure region 13 downwards in the direction of the arrow. The rear label end 6 is severed from the label band 22, which is secured in the label guide, and can thus follow this movement downwards by virtue of the widening of the guide channel 21.

Figure 8:
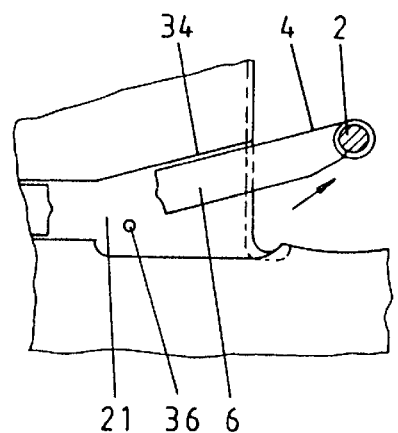

If the closure region 13 is then opened, according to FIG. 8, by the part 10 being swung away, it is possible for the end piece 2 to be removed with the label 4 in the direction of the arrow. The rear part 6 of the label, said rear part being located in the label guide 21, can readily follow the movement, although it is directed upwards to a greater or lesser extent, because the label channel 21 is widened upwards at its edge 34.

Located in the guide channel 21 is a small transverse bore 36, which is connected to a compressed-air or suction-air line. It is arranged at a location at which, until the removal of the casing end piece 2 from the closure region (FIG. 8), it is certain that the rear end 6 of the label 4 is located. As long as this is the case, the flow of air through the bore 36 is obstructed. However, if the closed end piece is removed with the label 4, the bore 36 becomes free; the air stream is no longer obstructed. The difference between the two states can easily be determined by a pressure sensor.

When this pressure sensor indicates the removal of the end piece and of the label, it can be assumed that the closure region 13 is free. After this signal has been received a suitable control device thus initiates the movement of the advancement rollers 27 and, thereafter, the actuation of the cutting device 24, 26, until the state according to FIG. 5 is reproduced.

Within the context of the invention, the closure region 13 is also to be regarded as being free when an article, for example a sausage body 1, which is to be handled by the apparatus is located in the vicinity, but has not yet arrived in the actual closure region 13. In the example according to FIG. 7, it is the case that, at the location at which it is to be closed, the sausage body 1 has not yet been shirred to form an end piece. Its large circumference thus prevents it from passing into the depth of the closure region 13. The latter is thus free. If the sausage body 1 is then shirred, without any great axial movement, to form an end piece at this location, it moves into the closure region 13 transversely with respect to its longitudinal extent. In this arrangement, it cannot displace the free end 5 of the label 4 out of the closure region. Rather, the free end 5 of the label is clamped, between the end piece and the border 9 of the closure region or the anvil 12, in a position which is suitable for the closure operation. If the end piece which is to be closed is also subject to a longitudinal movement when it is located in the closure region 13 or moves into the closure region, the guide channel 21 and the opening curve 28 thereof should be arranged such that the direction of the movement of the end piece and the direction in which the free label end passes into the closure region coincide.

It is important that the free label end is located in the closure region before the end piece which is to be closed reaches this region, and thus the free label end. Since the label end is thus, from the outset, very close to the location at which the closure takes place and its rear end is retained by the label guide, there is no risk of it accidentally being removed from the position in which it can be properly incorporated into the closure. Moreover, contact between the free label end and the end piece takes place under conditions which establish strong frictional adherence between these parts, with the result that the free label end is secured to that region of the end piece which is to be closed.

We claim:

1. Process for closing the shirred end piece of a casing and for incorporating a label into the closure of the end piece comprising the steps of providing a closure apparatus, which forms a closure region and a label guide intersecting said closure region, feeding the label which is to be incorporated along said guide, and introducing a first end thereof into the closure region before the end piece, while retaining a rear end in the label guide.

2. Process according to claim 1, including the step of drawing the rear end of the label out of the label guide only after a closure operation.

3. Process according to claim 1, characterized in that the end piece which is to be closed is moved into the closure region transversely with respect to its longitudinal extent.

4. Process according to claim 1, characterized in that the end piece which is to be closed is moved into the closure region with a longitudinal-movement component, and the label is fed from the same side as the end piece.

5. Process according to claim 1, characterized in that, during the introduction of the end piece into the closure region, the label is connected to a label band, from which it is to be severed.

6. Process according to claim 5, characterized in that the label is also connected to the label band during the closure operation.

7. Process according to claim 5, characterised in that the label is only connected to the label band via a narrow web.

8. Apparatus for closing the shirred end piece (2) of a casing (1) and for incorporating a label (4) into the closure, this apparatus comprising a closure region (13) which receives the end piece (2) for closure purposes and is closed, or can be closed, on at least three sides, and also comprising a label guide (21) which is equipped with advancement and retaining means (27), characterized in that the label guide (21) and its advancement and retaining means (27) are controlled and designed such that the label advancement takes place when the closure region (13) is free, and that a label which has been advanced and is ready for incorporation into the enclosure has its free end (5) in the closure region (13) and its rear end (6) in the label guide (21).

9. Apparatus according to claim 8, characterized in that the closure region (13) contains a guide (15, 16) for a closure staple, and the opening region of the label guide (21) in the direction of the staple guide (15, 16) has a width (between edges 34, 35) which considerably exceeds the width of the label (4).

10. Apparatus according to claim 8, characterized in that the closure region (13), is equipped with a sensor (bore 36) which signals the presence or the removal of the end piece (2).

11. Apparatus according to claim 10, characterized in that the sensor (bore 36) which signals the presence or removal of an end piece (2) is designed in the label guide (21) in order to determine the presence or removal of the rear end (6) of the label (4).

12. Apparatus according to claim 8, characterized in that, when the apparatus is connected to a filling device, the advancement means are automatically activated in an operating phase in which the closure region (13) does not contain an end piece.

13. Apparatus according to claim 8, characterized in that, with longitudinal movement of the end piece in the closure region (13), the label can be fed to the closure region from the same side as the end piece.

14. Apparatus according to claim 8, characterized in that a virtually endless label band (22) is provided, and the label guide (21) has a cutting device (24).

15. Apparatus according to claim 14, characterized in that the cutting device (24) is set for an incomplete cut (32), which leaves a narrow connecting web (33).

16. Apparatus according to claim 8, characterized in that the distance of the cutting device (24) from the closure region (13) is larger than half the label-advancement path.

17. Apparatus according to claim 8, characterized in that the label guide (21) runs mainly parallel to the plate-like parts (14) which form the closure region (13), and a deflection (28) is provided just in front of the closure region (13).

18. Apparatus according to claim 8, characterized in that, when use is made of a staple guide (15, 16) which is inclined with respect to the plane of the plates (14) which form the closure region (13), said staple guide is inclined with respect to the opening of the label guide.

* * * * *

UNITED STATES PATENT AND TRADEMARK OFFICE
CERTIFICATE OF CORRECTION

PATENT NO. : 5,842,915
DATED : 12/01/1998
INVENTOR(S) : Plewa et al

It is certified that error appears in the above-identified patent and that said Letters Patent is hereby corrected as shown below:

On the title page, item [22] PCT filing date should read as follows: Sep. 15, 1995.

Claim 10, column 8, line 8, after (13) delete ",".

Signed and Sealed this

Fifteenth Day of June, 1999

Attest:

Q. TODD DICKINSON

Attesting Officer        Acting Commissioner of Patents and Trademarks